United States Patent [19]
Pfeiffer et al.

[11] Patent Number: 5,741,384
[45] Date of Patent: Apr. 21, 1998

[54] PROCESS FOR MAKING GLASS FIBER-REINFORCED COMPOSITE MATERIAL

[75] Inventors: Bernhard Pfeiffer, Kelkheim; Detlef Skaletz, Mainz; Anne Texier, Lille; Horst Heckel, Darmstadt; Joachim Heydweiller, Rüsselsheim, all of Germany

[73] Assignee: Hoechst Aktiengesellschaft, Fankfurt, Germany

[21] Appl. No.: 249,156

[22] Filed: May 25, 1994

[30] Foreign Application Priority Data

May 27, 1993 [DE] Germany ............... 43 17 649.6

[51] Int. Cl.$^6$ ............... B32B 31/06; B32B 31/20
[52] U.S. Cl. ............... 156/182; 156/272.2; 156/379.9; 156/428; 264/177.1; 264/177.17; 264/209.4; 264/209.7; 264/136; 264/174; 264/211.24
[58] Field of Search ............... 264/136, 174, 264/211.24, 177.1, 177.17, 209.4, 209.7; 427/401.3, 412.1, 434.6; 156/182, 272.2, 379.6, 428

[56] References Cited

U.S. PATENT DOCUMENTS

| | | |
|---|---|---|
| 3,470,051 | 9/1969 | Meyer . |
| 4,743,413 | 5/1988 | Galichon . |
| 4,937,028 | 6/1990 | Glemet et al. . |
| 5,047,263 | 9/1991 | Glemet ............... 427/203 |
| 5,187,018 | 2/1993 | Glemet . |
| 5,389,440 | 2/1995 | Arpin et al. . |

FOREIGN PATENT DOCUMENTS

| | | |
|---|---|---|
| 0056703 | 7/1982 | European Pat. Off. . |
| A-0415517 | 3/1991 | European Pat. Off. . |
| 3821803 | 2/1990 | Germany . |
| A 4121915 | 1/1993 | Germany . |

OTHER PUBLICATIONS

Derwent Publications Ltd., AN 77-76961Y and JP A-52110999, Sep. 1977.

Patent Abstracts of Japan, vol. 14, No. 330, Jul. 16, 1990 and JP A-02120257, May 8, 1990.

*Primary Examiner*—Richard Weisberger
*Attorney, Agent, or Firm*—Frommer Lawrence & Haug LLP

[57] ABSTRACT

To prepare a glass fiber-reinforced composite material, a glass fiber strand is drawn through an agitated aqueous powder dispersion of a coupling agent over a deflection body, the water is removed, the powder is melted onto the glass fiber strand and the pretreated fiber strand is subsequently impregnated with polyolefins by means of melt pultrusion.

4 Claims, No Drawings

PROCESS FOR MAKING GLASS FIBER-REINFORCED COMPOSITE MATERIAL

The invention relates to a glass fiber-reinforced composite material and a process for its preparation, in which the glass fiber strand is impregnated with a melt of thermoplastic polymer.

The preparation of fiber-reinforced thermoplastic materials by melt impregnation of a large number of continuous filaments by the melt pultrusion process is known. Thus, according to EP-B 56703, a fiber-reinforced composite material which comprises thermoplastic polymer and at least 30% by volume of reinforcing filaments aligned in parallel is obtained. Because of the high viscosity of thermoplastic melts, inadequate or incomplete impregnation of the fiber strand may occur. It is therefore also known that, according to EP-B 56703, the fiber strand is opened by prestressing the fiber and guiding it over bars for deflection. According to EP-B 415517, the polymer melt is pressed through the fiber strand. Both processes have the disadvantage that damage to the fiber may occur due to the action of mechanical forces. It is likewise known that suitable adhesion promoters, plasticizing agents and coupling agents can be added to the thermoplastic melt (cf. inter alia, DE-C 2117095, US-A 3993726, EP-B 102158, 102159 and 150931). However, these substances must be metered in expensively by mechanical mixing of the thermoplastic melt. The use of these substances furthermore leads to increased thermal degradation of the matrix in the extruder during extrusion of the base polymer.

There was therefore the object of preparing glass fiber-reinforced composite materials with as complete as possible an impregnation of the fiber strand without damage to the fiber.

According to the invention, this object has been achieved by drawing the glass fiber strand through an agitated aqueous powder dispersion of a coupling agent over a deflection body, removing the dispersing agent (water), melting the powder onto the glass fiber strand and subsequently impregnating the pretreated fiber strand with polyolefins in a melt pultrusion. Carboxylic acid-modified polyolefins having a particle size of less than 150 micrometers preferably less than 30 micrometers are preferably used as the coupling agent. The solids content in the aqueous powder dispersion is preferably 10 to 20 g/l. A glass fiber-reinforced composite material which comprises a polyolefin and at least 40% by weight of glass fibers and has a tensile strength of more than 520 MPa, a longitudinal flexural strength of more than 550 MPa, a transverse flexural strength of more than 40 MPa and an impact strength of more than 180 kJm$^{-2}$ is prepared by the process according to the invention.

The advantages achieved by the process according to the invention are that a considerably better adhesion of the polyolefins to the glass fiber strand is achieved, without the action of high mechanical forces, by the glass fibers being spread wide open and the adhesion promoter being deposited directly on the glass fiber in a high concentration. Surprisingly, a glass fiber-reinforced composite material having significantly improved mechanical properties can be prepared by the process. A higher shearing force than was possible to date with the known addition of adhesion promoters in melt pultrusion can thus be transferred in the composite material. Furthermore, the expensive metering and mechanical mixing of the adhesion promoter with the polyolefin melt in the melt pultrusion are thereby avoided.

The resulting products can be employed as semi-finished products for filament winding, lamination and the like, and also as cut material for plasticizing/compression molding, blow molding and injection molding. Particular advantages exist if the product is used as a profile without an additional processing step.

The process according to the invention is illustrated in more detail by the following examples.

EXAMPLE 1

A comparison product having a glass fiber content of 50% by weight was prepared by a customary melt pultrusion process. Three glass fiber rovings of 1200 tex each of a commercially available type having a filament diameter of 17 micrometers were preheated at a rate of 3.75 m/min in a 3-zone heating unit at 150°/250°/250° C. Commercially available polypropylene granules with added stabilizers were used for the melt impregnation. Before the pultrusion, a commercially available adhesion promoter having an acid content of about 5% was mixed mechanically in powder form with the polyolefin granules. The adhesion promoter content was 1% by weight, based on the amount of matrix. Carboxylic acid-modified polyolefins having an acid content of about 5% were used for this purpose.

Tapes (25 mm wide, 0.25 mm thick) were produced from the composite material and were then laminated to test specimens (8 or 12 layers, about 2 or 3 mm thick). The mechanical test data are summarized in Table 1.

EXAMPLE 2

A product which had been pretreated according to the invention with an agitated aqueous powder dispersion was prepared analogously to Example 1.

For this, three glass fiber rovings of 1200 tex each of a commercially available type having a filament diameter of 17 micrometers were drawn at a rate of 3.75 m/min through an aqueous powder dispersion of carboxylic acid-modified polyolefins.

The powder had an average particle size of less than 40 micrometers. 20 g/l of solid were added to the bath. A nonionic commercially available surfactant was used as a dispersing auxiliary, and was added in a concentration of 0.4 g/l. Nonylphenol polyglycol ether was used. The fiber strand was passed over 5 pins. The total angle of wrap of each fiber strand was 250°. Settling of the suspension was prevented by mechanical stirring. In addition agglomerates were destroyed by ultrasound.

To remove the dispersing agent (water), each strand was blown off and dried in a 3-zone drying oven at 450°/250°/250° C. in a countercurrent of air, and the powder was melted.

The polymer content on the pretreated fiber strand was determined by incineration as 3.6% by weight of the fiber weight (with deduction of 0.5% by weight of vaporizable size constituents).

Commercially available polypropylene granules with stabilizers and with the addition of 1% by weight of the adhesion promoter described in Example 1 were used for melt impregnation of the pre-impregnated glass fiber strand. At a fiber content of 50% by weight, a total content of adhesion promoter of 4.1%, based on the amount of matrix, resulted.

Tapes (25 mm wide, 0.25 mm thick) were produced from the composite material and were then laminated to test specimens (8 or 12 layers, about 2 or 3 mm thick). The mechanical test data are shown in Table 1.

TABLE 1

| Test | In accordance with | Example 1 | Example 2 |
|---|---|---|---|
| Glass fiber (% by wt.) | | 52.4 | 51.9 |
| Tensile strength/MPa | DIN 29971 | 508 ± 26 | 523 ± 24 |
| Longitudinal flexural strength/MPa | DIN EN 63 (L = 16 d) | 506 ± 26 | 557 ± 26 |
| Transverse flexural strength/MPa | DIN EN 63 (L = 7d) | 29.6 ± 1.3 | 42.1 ± 1 |
| Impact strength/kJ $m^{-2}$ | DIN 53453 | 152 ± 10 | 189 ± 11 |

EXAMPLE 3

A composite material was prepared analogously to Example 2, but the melt impregnation was carried out without addition of an adhesion promoter. The solids content in the aqueous powder dispersion was adjusted such that, for a glass fiber content of 50% by weight, a coupling agent content of 1%, based on the matrix, was achieved.

For this, 3 glass fiber rovings of the same fiber type were drawn at a rate of 3.75 m/min through an agitated aqueous powder dispersion of carboxylic acid-modified polyolefins.

The powder had a particle size of less than 24 micrometers. 15 g/l of solid were added to the bath. A nonionic surfactant was used as a dispersing auxiliary and (in accordance with Example 2) was added in a concentration of 0.28 g/l.

The fiber was passed over 5 pins. The total angle of wrap of each fiber strand was 250°. Settling of the suspension was prevented by mechanical stirring. Additional agglomerates were destroyed by means of ultrasound.

To remove the dispersing agent, each strand was blown off and dried in a 3-zone drying oven at 450°/250°/250° C. in a countercurrent of air, and the powder was melted.

The polymer content of the pretreated fiber strand was determined by incineration as 1.5±0.05% by weight of the fiber weight (with deduction of 0.5% by weight of vaporizable size constituents). At a fiber content of 50% by weight, this corresponds to a coupling agent content of 1% by weight, based on the matrix.

Commercially available polypropylene granules with stabilizers, but without added adhesion promoter, were used for melt impregnation of the pre-impregnated glass fiber strand.

Tapes (25 mm wide, 0.25 mm thick) were produced from the composite material and were then laminated to test specimens (8 or 12 layers, about 2 or 3 mm thick). The mechanical test data are shown in Table 2.

TABLE 2

| Test | In accordance with | Example 1 | Example 2 |
|---|---|---|---|
| Glass fiber (% by wt.) | | 52.4 | 53.4 |
| Tensile strength/MPa | DIN 29971 | 508 ± 26 | 589 ± 20 |
| Longitudinal flexural strength/MPa | DIN EN 63 (L = 16 d) | 506 ± 26 | 589 ± 23 |
| Transverse flexural strength/MPa | DIN EN 63 (L = 7d) | 29.6 ± 1.3 | 45.2 ± 1 |
| Impact strength/kJ $m^{-2}$ | DIN 53453 | 152 ± 10 | 188 ± 4 |

EXAMPLE 4

A glass fiber strand was drawn through an aqueous dispersion of the pulverulent adhesion promoter of Example 1 (="coupling agent") at different contents of adhesion promoter and surfactant in the bath, under the test conditions of Examples 2 and 3. The contents are shown in Table 3. The surfactant content was proportional to the amount of adhesion promoter. The treated glass fiber strand was dried, and the content of adhesion promoter absorbed was then determined by incineration. This content is shown in column 3 of Table 3. It was converted into percent by weight, based on the polymer matrix, assuming that the treated strand is further processed to a composite material with a glass fiber content of 50% by weight and a polymer matrix of 50% by weight. During this further processing, about 0.5% by weight of vaporizable size constituents are retained, and are lost during incineration. The content calculated in this way is shown in column 4 of Table 3.

It can be seen that at about 12 g/l of adhesion promoter in the aqueous dispersion, about 1% by weight of adhesion promoter, based on the glass fiber or based on the (later) polymer matrix, is absorbed on the fiber.

TABLE 3

| Weights Adhesion promoter in the bath g of solid/l | Surfactant content in the bath g/l | Incineration Weight loss of the pretreated fiber strand % by weight | Calculation Coupling agent based on the matrix % by weight |
|---|---|---|---|
| 0 | 0 | 0.5 | 0 |
| 2 | 0.04 | 0.6 | 0.1 |
| 4 | 0.08 | 0.8 | 0.3 |
| 10 | 0.19 | 1.2 | 0.8 |
| 15 | 0.28 | 1.7 | 1.2 |
| 20 | 0.38 | 2.3 | 1.8 |
| 25 | 0.47 | 2.8 | 2.3 |
| 45 | 0.85 | 3.8 | 3.3 |

We claim:

1. A process for the preparation of a glass fiber-reinforced composite material by melt pultrusion, which comprises drawing the glass fiber strand through an agitated aqueous powder dispersion of a coupling agent over a deflection body, removing the dispersing agent, melting the powder onto the glass fiber strand and subsequently impregnating the pretreated fiber strand with polyolefins in a melt pultrusion.

2. The process as claimed in claim 1, wherein a carboxylic acid-modified polyolefin is used as the coupling agent.

3. The process as claimed in claim 1, wherein the coupling agent is employed in a particle size of less than 150 micrometers, preferably less than 30 micrometers.

4. The process as claimed in claim 1, wherein the solids content in the aqueous powder dispersion is preferably 10 to 20 g/l.

* * * * *